(12) United States Patent
Shirk

(10) Patent No.: US 7,654,553 B2
(45) Date of Patent: Feb. 2, 2010

(54) FIFTH WHEEL COUPLING WITH SAFETY LATCH

(75) Inventor: Paul W. Shirk, Goshen, IN (US)

(73) Assignee: Locjaw Safety Lock, LLC, Goshen, IN (US)

( * ) Notice: Subject to any disclaimer, the term of this patent is extended or adjusted under 35 U.S.C. 154(b) by 192 days.

(21) Appl. No.: 11/465,012

(22) Filed: Aug. 16, 2006

(65) Prior Publication Data

US 2008/0067781 A1  Mar. 20, 2008

(51) Int. Cl.
  B62D 53/06 (2006.01)
  B62D 53/10 (2006.01)
(52) U.S. Cl. .................................. 280/433; 280/438.1
(58) Field of Classification Search .............. 280/433, 280/434, 435, 436, 437, 438.1, 439, 440, 280/441
  See application file for complete search history.

(56) References Cited

U.S. PATENT DOCUMENTS

| 1,968,623 | A | * | 7/1934 | Swift | 280/437 |
|---|---|---|---|---|---|
| 3,109,669 | A | * | 11/1963 | Arnett | 280/434 |
| 3,251,609 | A | * | 5/1966 | Daniels | 280/434 |
| 3,251,610 | A | * | 5/1966 | Chosy | 280/435 |
| 4,208,062 | A | * | 6/1980 | Maassen | 280/434 |
| 4,871,182 | A | * | 10/1989 | Altherr et al. | 280/434 |
| 5,472,223 | A | * | 12/1995 | Hawthorne et al. | 280/437 |
| 6,092,825 | A | * | 7/2000 | Flater | 280/433 |
| 6,520,527 | B2 | * | 2/2003 | Laarman | 280/437 |
| 6,695,337 | B1 | * | 2/2004 | Breese et al. | 280/433 |
| 7,100,935 | B1 | * | 9/2006 | Dunbar | 280/433 |
| 2007/0257469 | A1 | * | 11/2007 | Burns et al. | 280/433 |

* cited by examiner

*Primary Examiner*—Lesley Morris
*Assistant Examiner*—Marc A Scharich
(74) *Attorney, Agent, or Firm*—Botkin & Hall, LLP

(57) ABSTRACT

A safety latch is mounted in the keyhole of a fifth wheel coupling for joining the sections of an articulated vehicle. The safety latch is movable from an inactive position permitting the kingpin to move through the slot and into the aperture to an active position blocking the keyhole slot thereby preventing movement of the kingpin through the keyhole slot when the sections are coupled together.

6 Claims, 15 Drawing Sheets

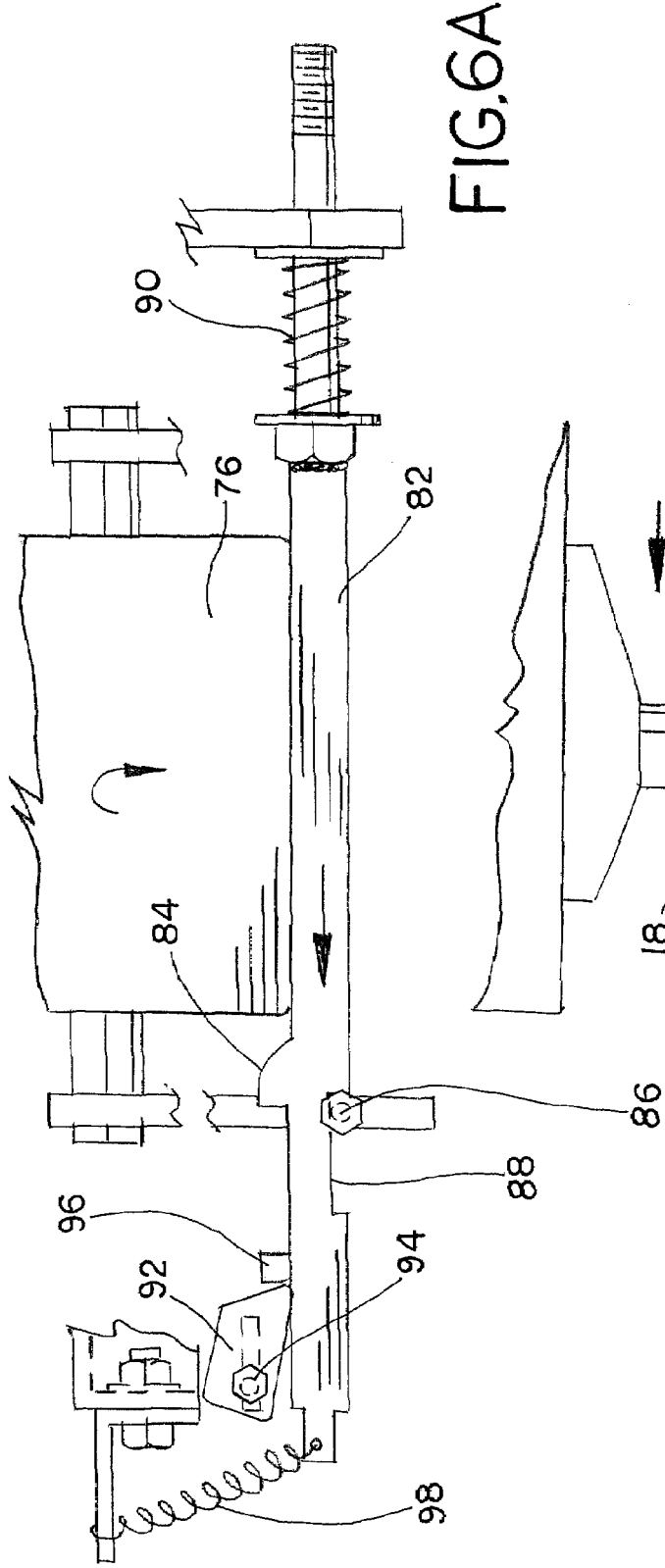
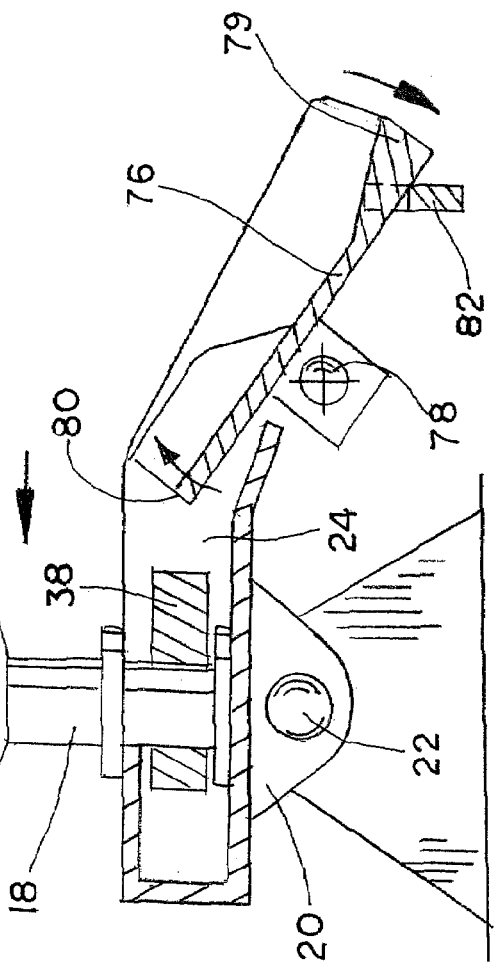
FIG.6A
FIG.6B

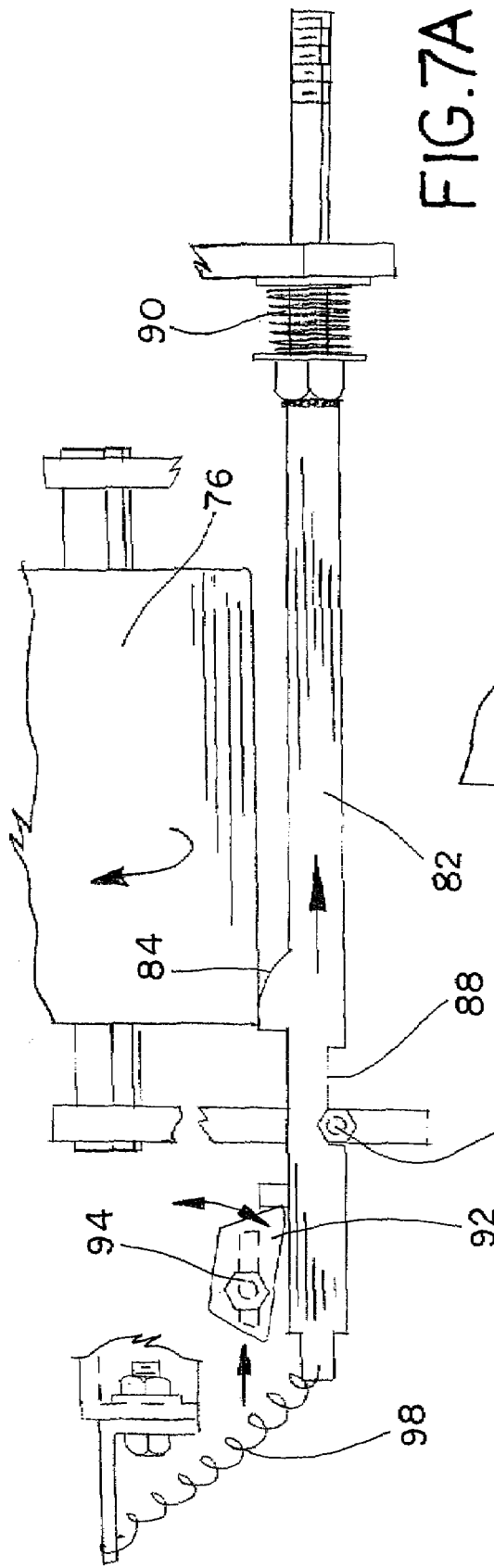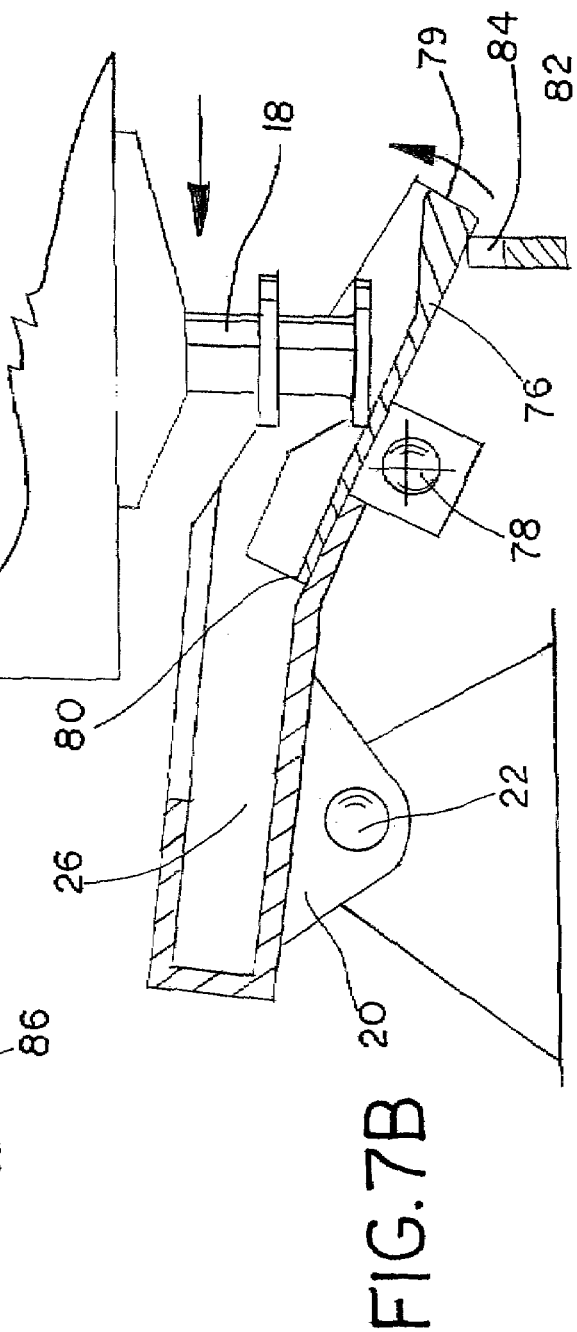

FIFTH WHEEL COUPLING WITH SAFETY LATCH

TECHNICAL FIELD

This invention relates to a fifth wheel coupling for joining sections of an articulated vehicle.

BACKGROUND OF THE INVENTION

Sections of an articulated vehicle, such as the sections of a tractor-trailer combination vehicle, are commonly coupled together by a fifth wheel coupling, which includes a strike plate (normally mounted on the tractor) with a locking mechanism that captures a kingpin (normally mounted on the trailer). The fifth wheel coupling permits the tractor to pivot relative to the trailer in a manner well known to those skilled in the art. Normally, the only connection between the tractor and trailer is through the kingpin, so that if the locking mechanism fails, either through a broken component or because the locking mechanism was improperly latched, the sections of the vehicle may separate from one another, resulting in an extremely dangerous situation in which the trailer breaks away from the tractor and cannot be controlled. Obviously, in such a situation, property damage and injures or death of bystanders is likely.

Accordingly, a safety latch that prevents unwanted separation between the tractor and trailer is desirable. However, to be effective, the latch must be engaged whenever the vehicle sections are coupled, but the safety latch must be easily inactivated to permit separation of the vehicle sections when uncoupling is desired.

SUMMARY OF THE INVENTION

The invention relates to a fifth wheel coupling for coupling sections of an articulated vehicle. The coupling includes a main plate mounted on one of the sections (normally the tractor) which defines a keyhole slot through which a kingpin mounted on the other section (normally the trailer) travels. The keyhole slot terminates in a coupling aperture, and a locking mechanism mounted on the plate locks the kingpin in the aperture to thereby couple the sections together. A safety latch is mounted in the keyhole and is movable from an inactive position permitting the kingpin to move through the slot and into the aperture to an active position blocking the keyhole slot thereby preventing movement of the kingpin through the keyhole slot when the sections are coupled together. A safety latch operating mechanism moves the safety latch from the active to the inactive position to permit movement of the kingpin out of the keyhole slot to thereby permit uncoupling of the sections.

BRIEF DESCRIPTION OF THE DRAWINGS

FIGS. 6A and 7A are fragmentary views in perspective of the safety latch mechanism of the fifth wheel coupling of FIGS. 1-5 illustrating the manner in which the safety latch is moved between the active and inactive positions;

FIGS. 6B and 7B are cross sectional views taken through the safety latch mechanism corresponding to FIGS. 6A and 7A;

DETAILED DESCRIPTION OF INVENTION

Figure 12:
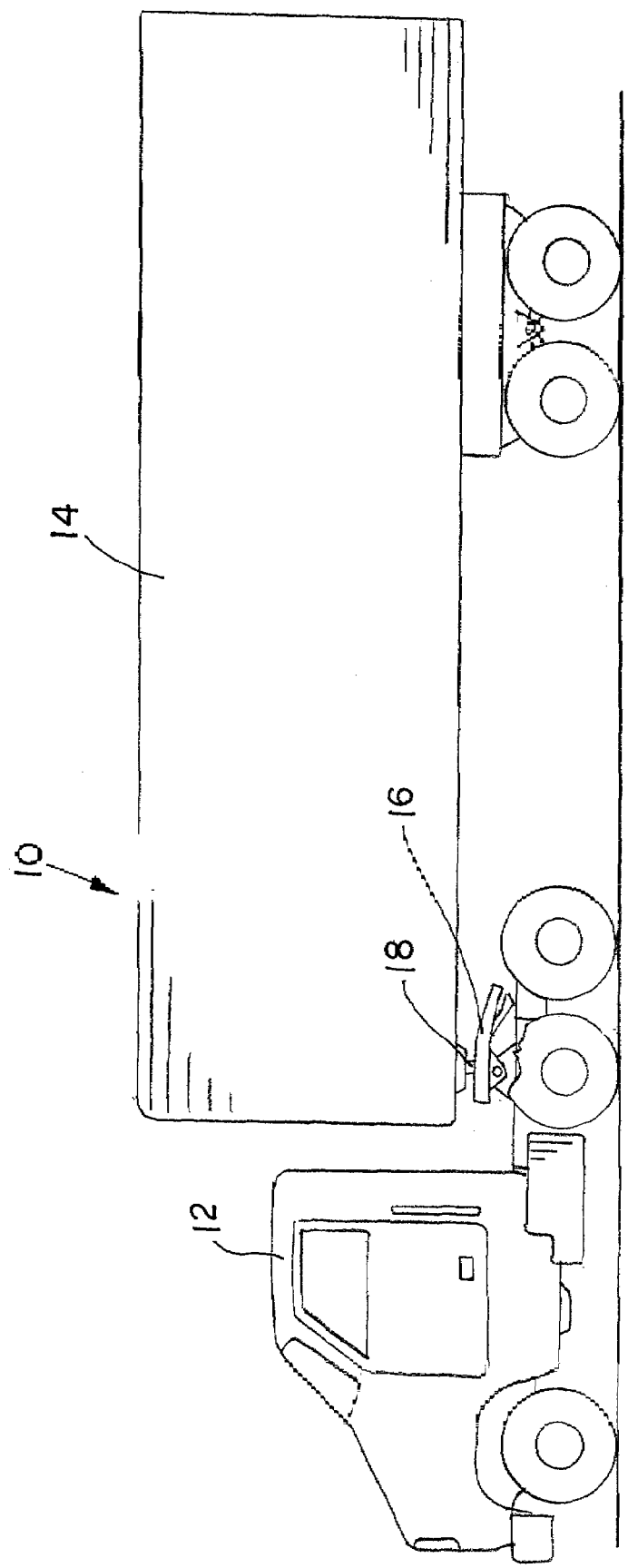
FIG. 12 is a schematic illustration of a tractor-trailer combination vehicle in which the tractor and trailer are coupled by a fifth wheel coupling made pursuant to the teachings of the present invention.

Referring now to FIG. 12, an articulated vehicle generally indicated by the numeral 10 includes a tractor section 12 and a trailer section 14, which are coupled together by a fifth wheel coupling generally indicated at 16 mounted on the tractor section 12 and which is made pursuant to the teachings of the present invention. The fifth wheel coupling captures a kingpin 18 mounted on the trailer section 14 and permits the sections to articulate with respect to one another when the sections are coupled together. As will hereinafter be explained, the fifth wheel coupling 16 includes a release which permits the sections 12 and 14 to be separated from one another, and also includes a safety latch that maintains the sections together if the coupling fails because of a component failure or a failure of the sections to properly couple together.

Figure 1:
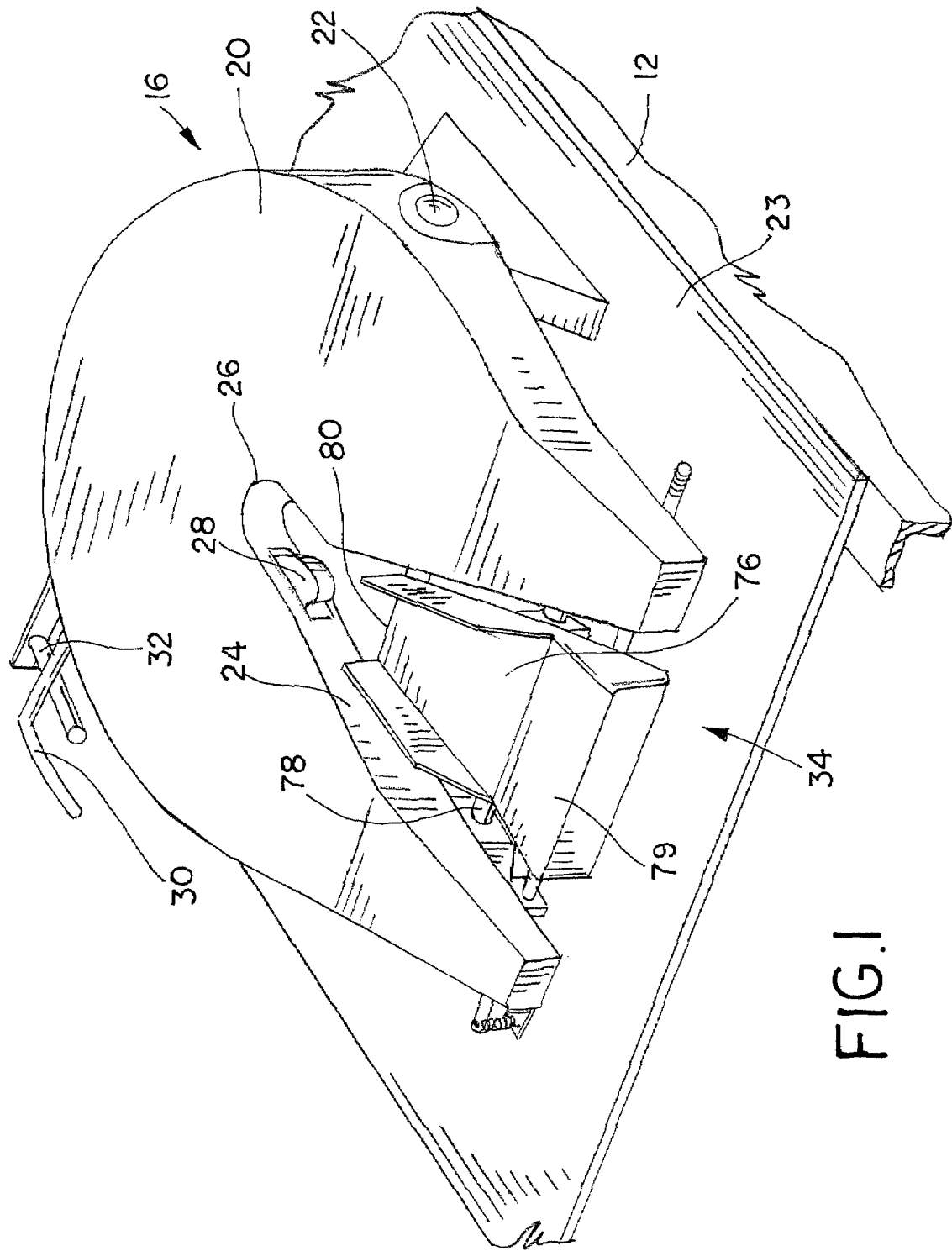
FIG. 1 is a view in perspective of one embodiment of a fifth wheel coupling with a safety latch made pursuant to the teachings of the present invention.

Referring now to FIG. 1, the fifth wheel coupling 16 includes a main plate 20 which is pivotally mounted via pivots 22 to a support member 23 mounted on the tractor section 12. The main plate 20 defines a keyhole slot 24, which terminates in a coupling aperture 26. When the tractor section 12 and trailer section 14 are coupled, the kingpin 18 travels through the keyhole slot 24 and into the coupling aperture 26, where it is captured by a locking jaw, including a portion 28 of which is illustrated projecting into the keyhole slot 24 in FIG. 1. The locking jaw is controlled by a linkage mounted on the underside of the main plate 20, as will be hereinafter described, and which includes handles 30, 32, which are manually operated. According to the invention, a safety latch 34 prevents accidental dislodging of the kingpin 18 from the keyhole slot 24.

Figure 2:
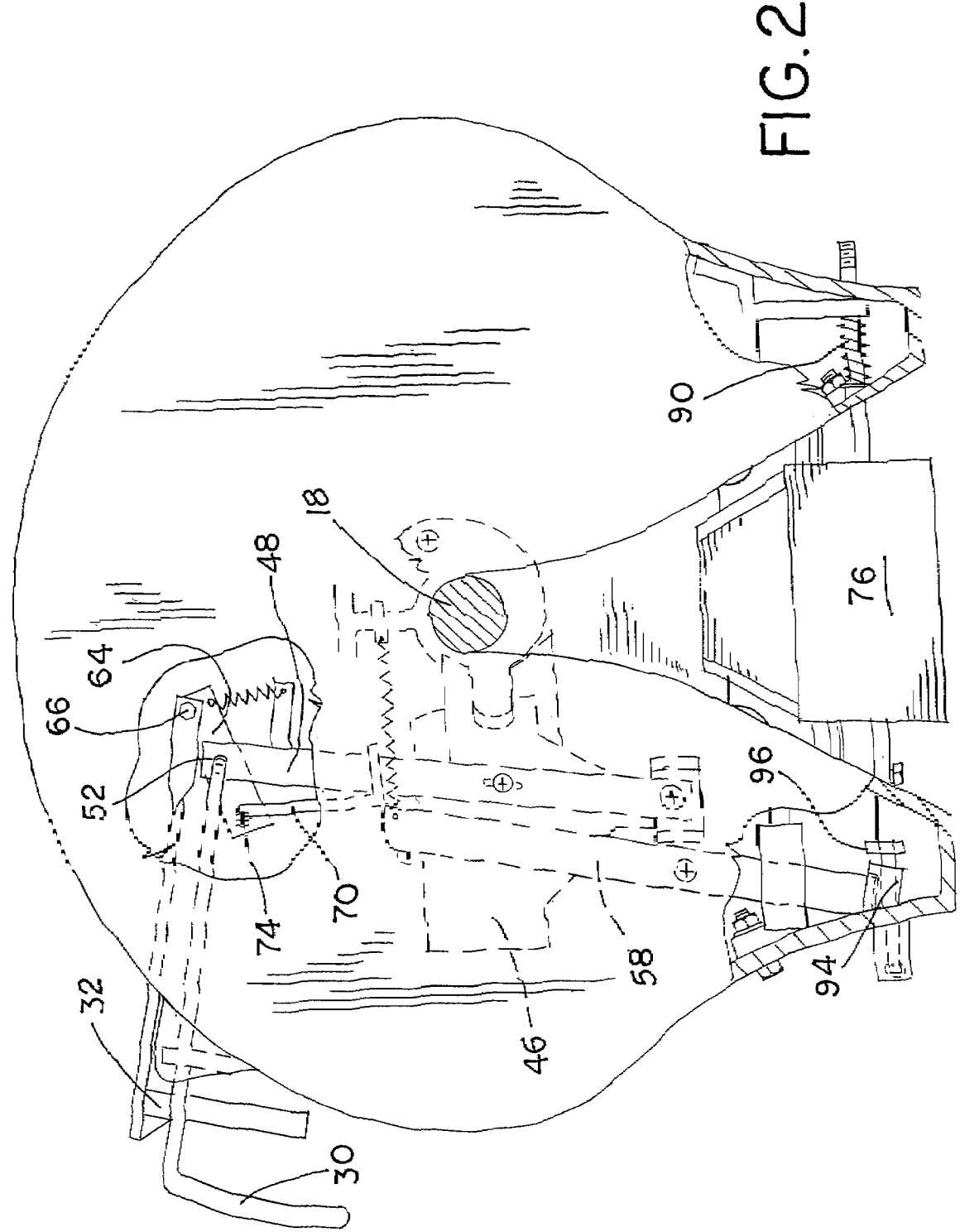
FIG. 2 is a top plan view, partly broken away to show details, of the fifth wheel coupling illustrated in FIG. 1.
Figure 3:
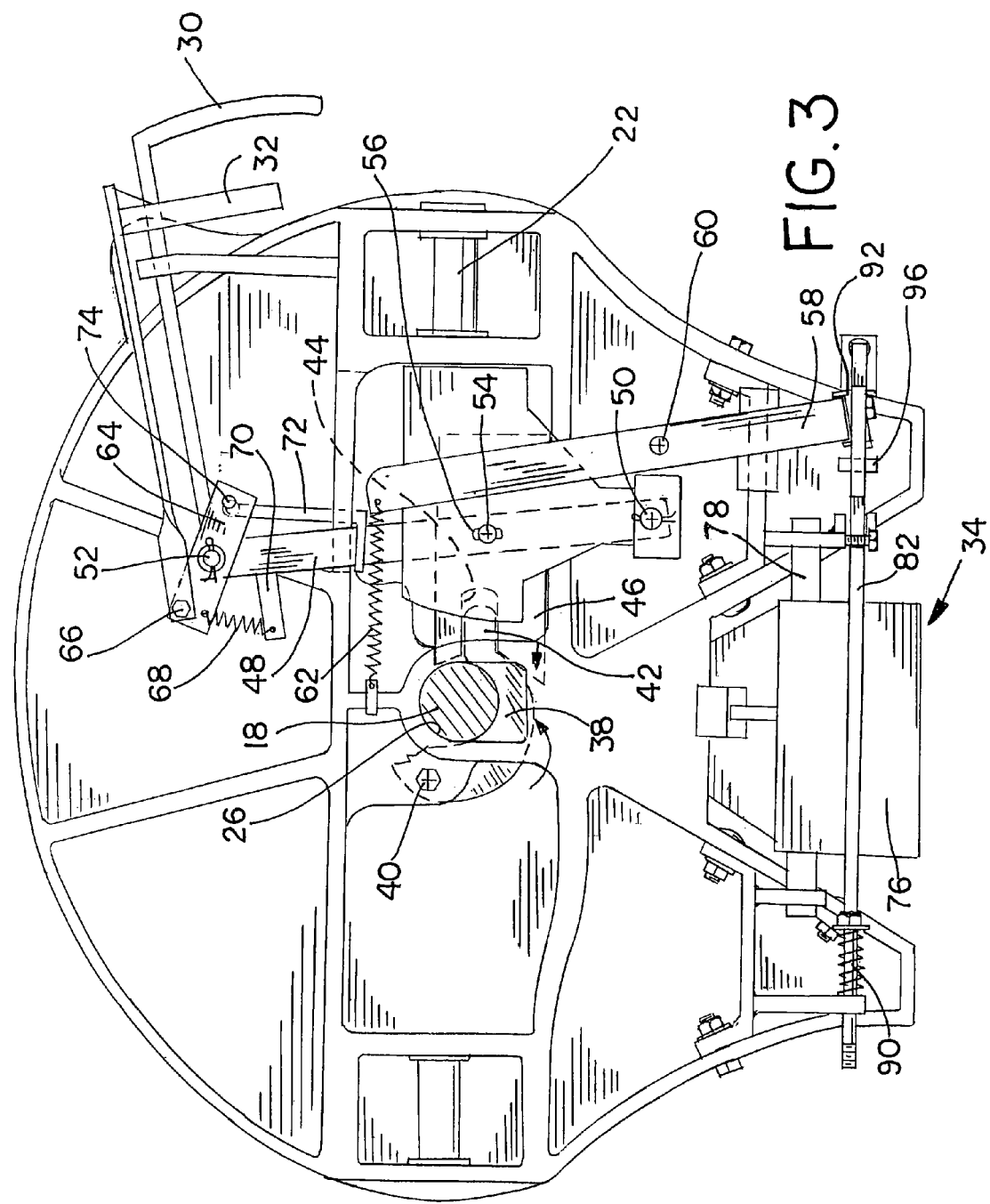
FIG. 3 is a bottom view of the fifth wheel coupling illustrated in FIGS. 1 and 2, illustrating the safety latch engaged.
Figure 4:
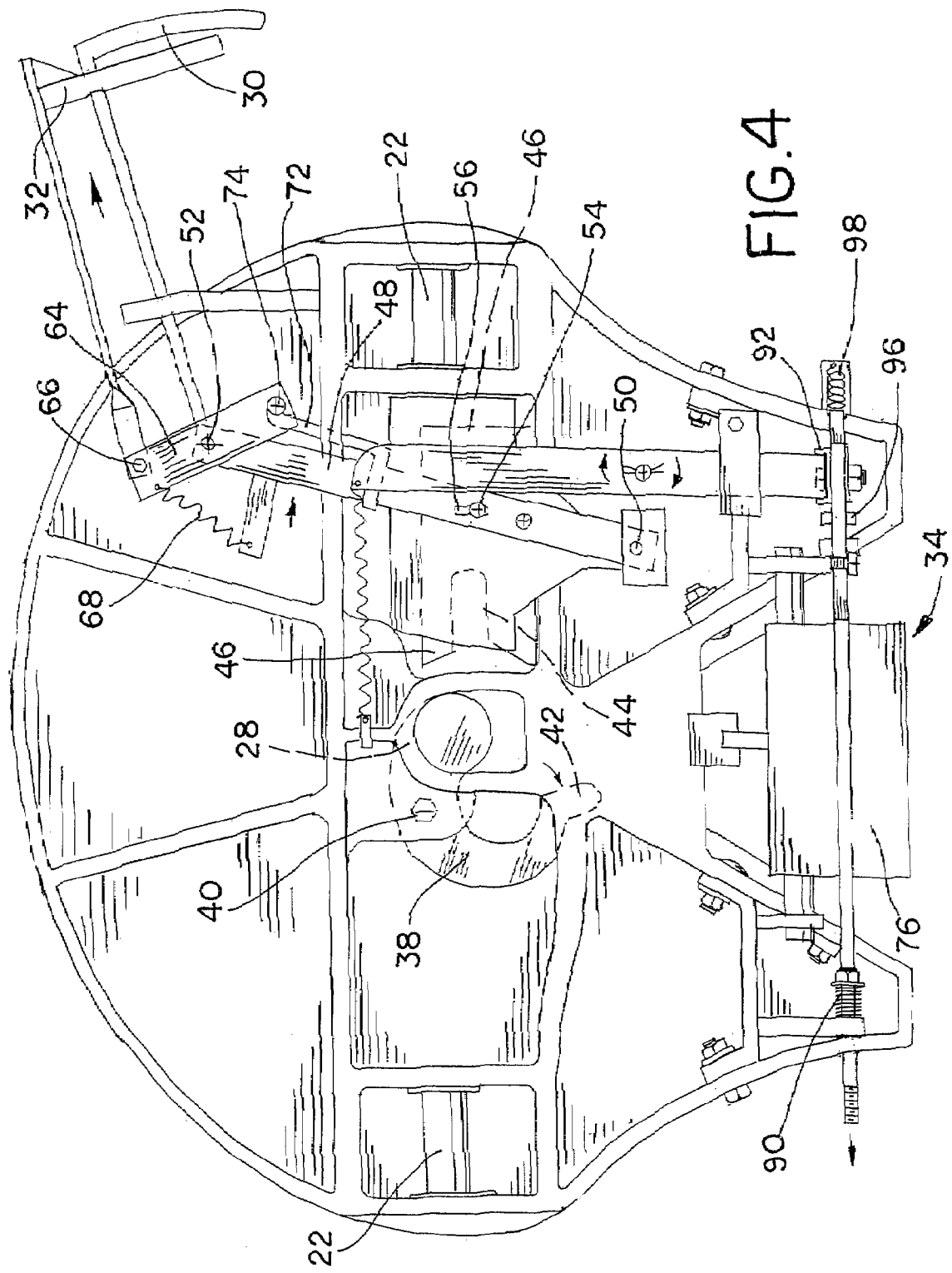
FIG. 4 is a view similar to FIG. 3, but illustrating the safety latch disengaged to permit uncoupling of the sections.

Referring now to FIGS. 2-4, the kingpin 18 is retained in the locking aperture 26 by a locking jaw 38, which is pivotally mounted on the main plate 20 via pivot 40. A tab 42 extends from locking jaw 38 and is slidably received in a slot 44 in a locking plate 46 slidably mounted on the underside of the main plate 20. Locking plate 46 is operated by a lever 48, one end of which is pivotally mounted to the underside of the main plate 20 by pivot 50, and the other end of which is pivotally mounted to handle 30 by pivot 52. A pivot 54 extends through a slot 56 in the lever 48 to thereby pivotally connect the lever 48 with the plate 46 such that pivoting of the lever 48 slides the locking plate 46 toward and away from the locking aperture 26. The safety latch 34 is operated by another lever 58, which is pivotally mounted to the main plate 20 by pivot 60, but pivots in a plane offset from the plane in which the lever 48 pivots. A spring 62 connected between one end of the lever 58 and the main plate 20 urges the lever 58 counterclockwise viewing FIGS. 3 and 4. A rocker arm 64 is mounted on lever 48 via the pivot 52, and may be pivoted in the clockwise direction by operation of the handle 32, which is pivotally attached to one end of rocker arm 64 via a pivot 66. A spring 68 is connected between the rocker arm 62 and a bracket 70 extending from lever 48 to urge rocker arm 64 in a counter-clockwise direction. A sliding member 72 is mounted for sliding movement along the lever 48, and is pivotally connected as at 74 to the rocker arm 64 at the end thereof opposite the pivot 66. Accordingly, the handle 32 may be pulled outwardly to slide the sliding member 72 along the lever 48 and into engagement with a projection (not shown) projecting toward the main plate 20 from the end of the lever 58 to which spring 62 is attached. Upon engagement with the projection, the lever 58 is connected for rotation with the lever 48, but upon release of the handle 32, the spring 68 causes the sliding member 72 to move away from the projection on lever 58, thereby permitting the spring 62 to urge the lever 58 back to the position illustrated in FIG. 3.

Figure 5:
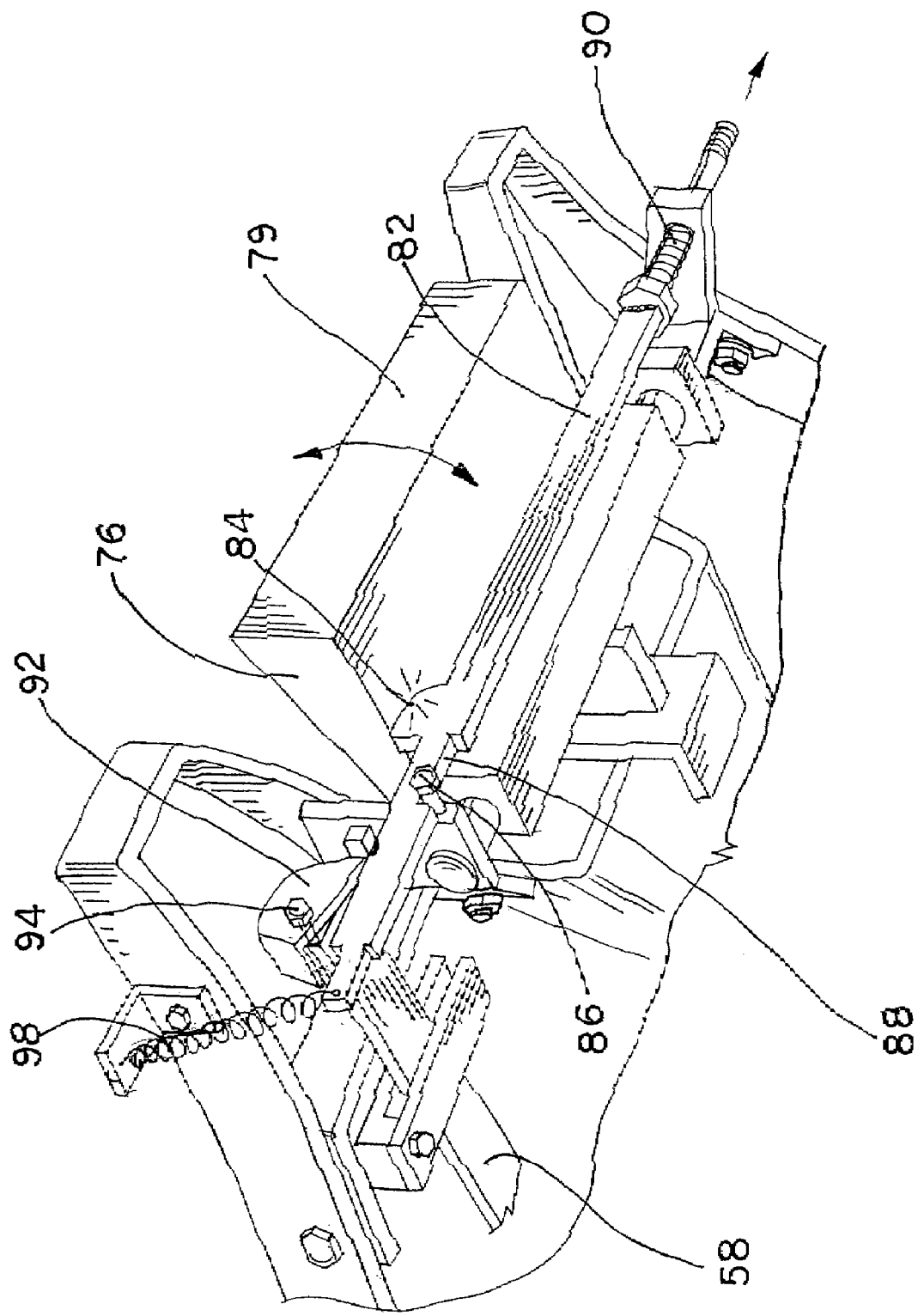
FIG. 5 is a fragmentary view in perspective, taken from below, of a portion of the fifth wheel coupling of FIGS. 1-4 illustrating the safety latch mechanism.

Referring now to FIGS. 5-7 as well as to FIGS. 1-4, the safety latch 34 includes a weighted plate 76 which is pivotally connected in the keyhole slot 24 by pivot shaft 78, which extends across the keyhole slot 24 and is rotatably supported by the main plate 20. The plate 76 includes a weighted end 79 and an opposite active end 80. The weight of the weighted end biases the latter toward the support 23, which raises the opposite active end 80 into an active position blocking the keyhole slot 24. A camming arrangement is provided so that the plate 76 may be rotated into a position in which the active end is rotated into an inactive position in which it no longer blocks the keyhole slot 24. The camming arrangement includes a sliding camming shaft 82 which is slidably mounted on the main plate 20 and extends across the underside (viewing FIG. 1) of the weighted plate 76. The shaft 82 carries a cam 84, which is moved from a position displaced from the plate 76 (FIG. 6A) in which the active end 80 is in the active position (FIG. 6B), to a position in which the cam 84 is engaged with the weighted end 78 (FIG. 7A), thereby rotating the plate 76 to move the active end into its inactive position (FIG. 6A). A stop pin 86 on the main plate 20 is received within a notch 88 on shaft 82 so that the range of movement of the shaft 82 is limited to that allowed by the width of the notch 88. A spring 90 urges the shaft 82 into a position in which the stop pin 86 is engaged with one end of the notch 88. In this position, the cam 84 is displaced from the plate 76 (FIG. 6A). The camming shaft 82 is operated by the lever 58. A head 92 is attached to the end of the lever 58 by a pivot connection 94 opposite the end to which the spring 62 is attached. Head 92 engages a projection 96 extending from camming shaft 82 when the lever 58 is pivoted, so that pivoting of the lever is translated into movement of the camming shaft. A spring 98 yieldably maintains the shaft 82 and the head 92 in engagement with one another.

Figure 8A:
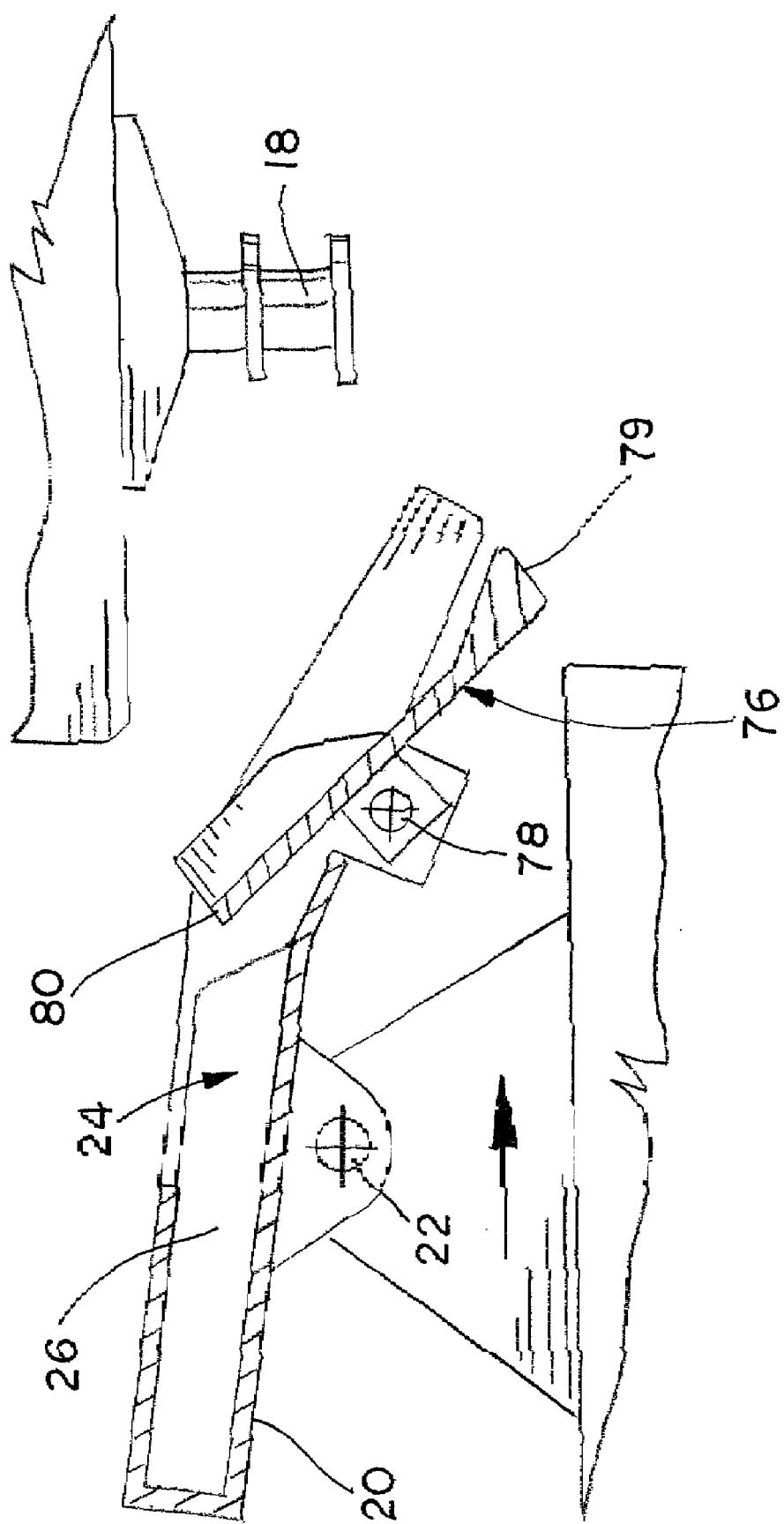
FIGS. 8A, 8B, 8C, and 8D are schematic cross sectional views taken through the fifth wheel coupling illustrating the manner in which the safety latch operates as the sections of the vehicle are coupled.
Figure 8B:
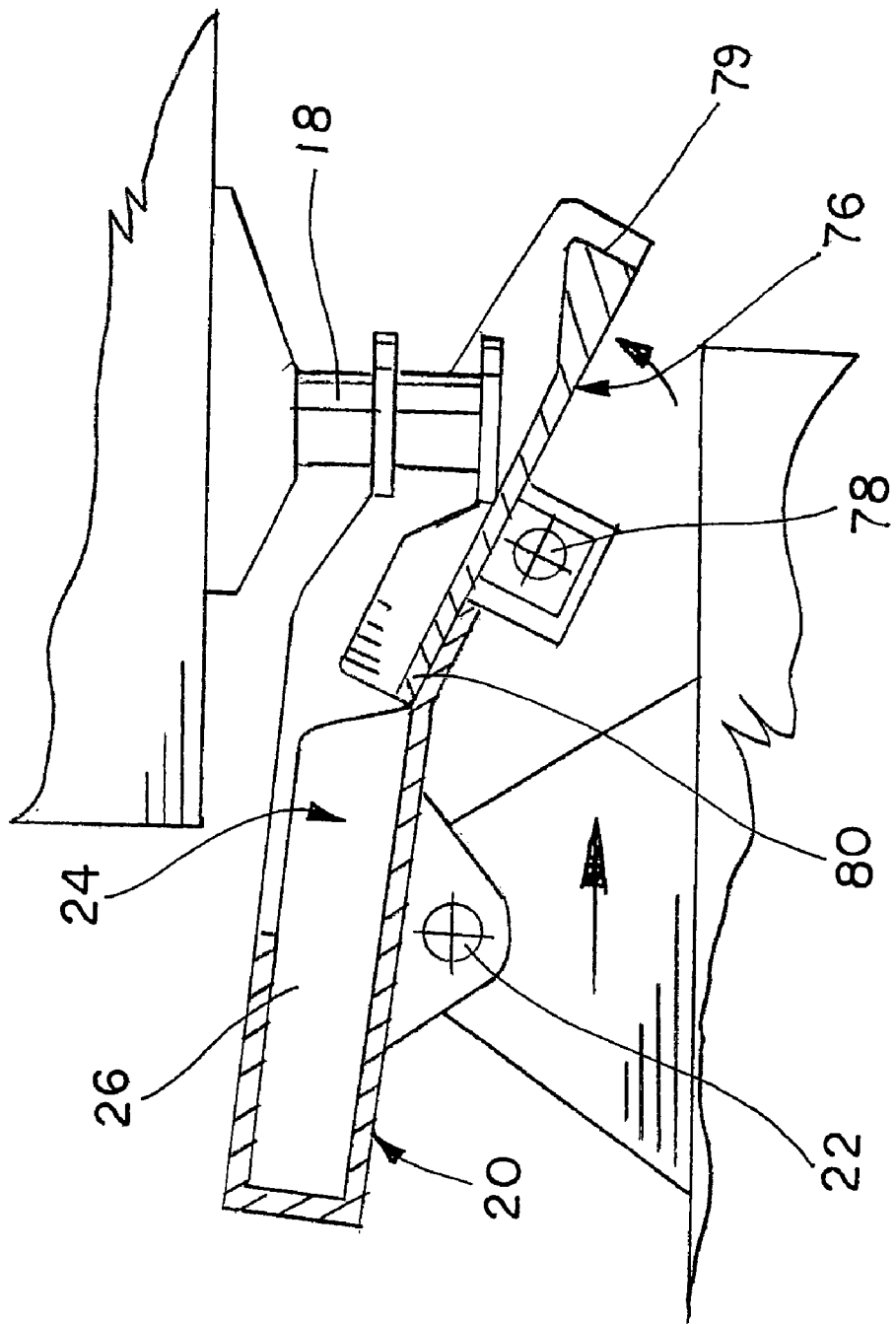
Figure 8C:
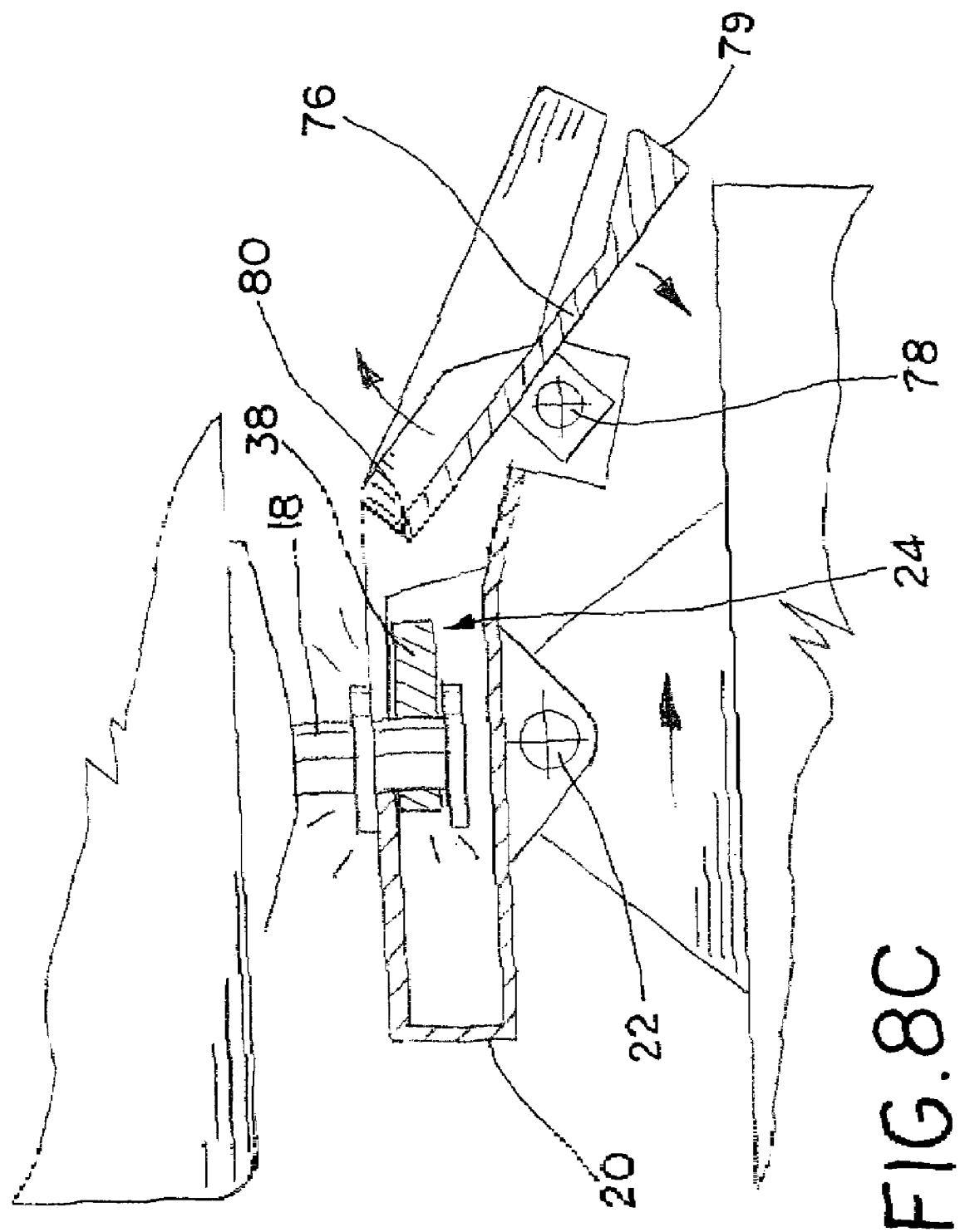
Figure 8D:
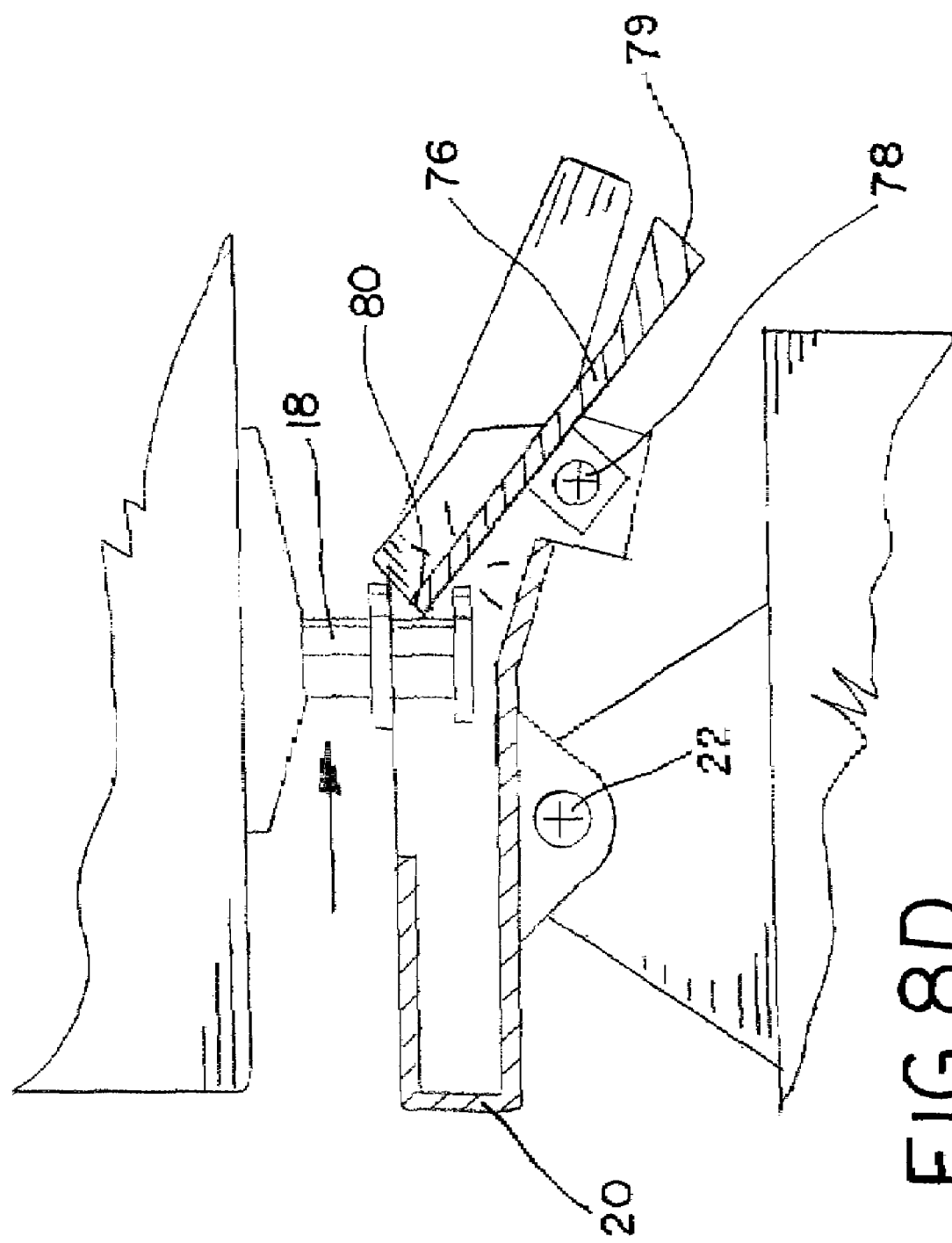

In operation, and referring to FIGS. 8A-D, it should be recognized that both the tractor and trailer are heavy, and that the trailer is coupled to the tractor by aligning the tractor with the trailer and then backing the tractor into the trailer to engage the kingpin. Accordingly, the kingpin 18 engages the main plate 20 with substantial force. It must also be recognized that in order to couple the sections successfully, the kingpin 18 must be aligned with the keyhole slot 24. Referring to FIG. 8A, just prior to the engagement of the kingpin 18 with the main plate 20, the plate 76 is in the active position with the weighted end 79 biasing the active end 80 into the position blocking the keyhole slot. However, as illustrated in FIG. 8B, the weight of the trailer and the force of the engagement of the kingpin 18 with the plate 76 is more than sufficient to overcome the bias of the plate 76, to thereby drive the latter into the inactive position as illustrated in FIG. 8B to permit the kingpin 18 to move through the keyhole slot 24 and into the locking aperture 26. As the kingpin 18 moves into the locking aperture 26, the kingpin 18 strikes the portion 28 of the locking jaw 38 pivoting the latter to allow the tab 42 to engage the recess in the sliding plate 42, thereby locking the kingpin 18 in place. After the kingpin 18 moves past the plate 76 and into the locking aperture, the weight of the plate causes the latter to rotate back into the active position in which the keyhole slot 24 is blocked. As illustrated in FIG. 8D, if the kingpin dislodges from the locking aperture, the kingpin 18 is prevented from moving through the keyhole aperture because the kingpin 18 engages the active end of the plate 76. Because the arc of movement of the plate 76 is limited, the kingpin will remain in the keyhole slot 24. It should be noted that during the coupling process the camming shaft 82 has not been moved and the cam 84 remains disengaged from the plate 76.

When decoupling of the tractor from the trailer is to be effected, handle 32 is squeezed toward handle 30 to move the slider 72 toward the lever 58, thus coupling the lever 58 for movement with the lever 48. The handles 30, 32 are then moved together into the positions illustrated in FIG. 4. Accordingly, lever 48 is pivoted to move the locking plate away from the locking jaw 38, allowing the later to pivot to open the locking aperture 26 (FIG. 4), freeing the kingpin 18 to move out of the locking aperture 26. At the same time, lever 58 is pivoted to drive the cam 84 onto the plate 76 (FIG. 7A), causing the latter to pivot into the inactive position illustrated in FIG. 7B. Accordingly, the kingpin 18 is free to move out of the keyhole slot 24 as the tractor is driven away from the trailer.

Figure 9:
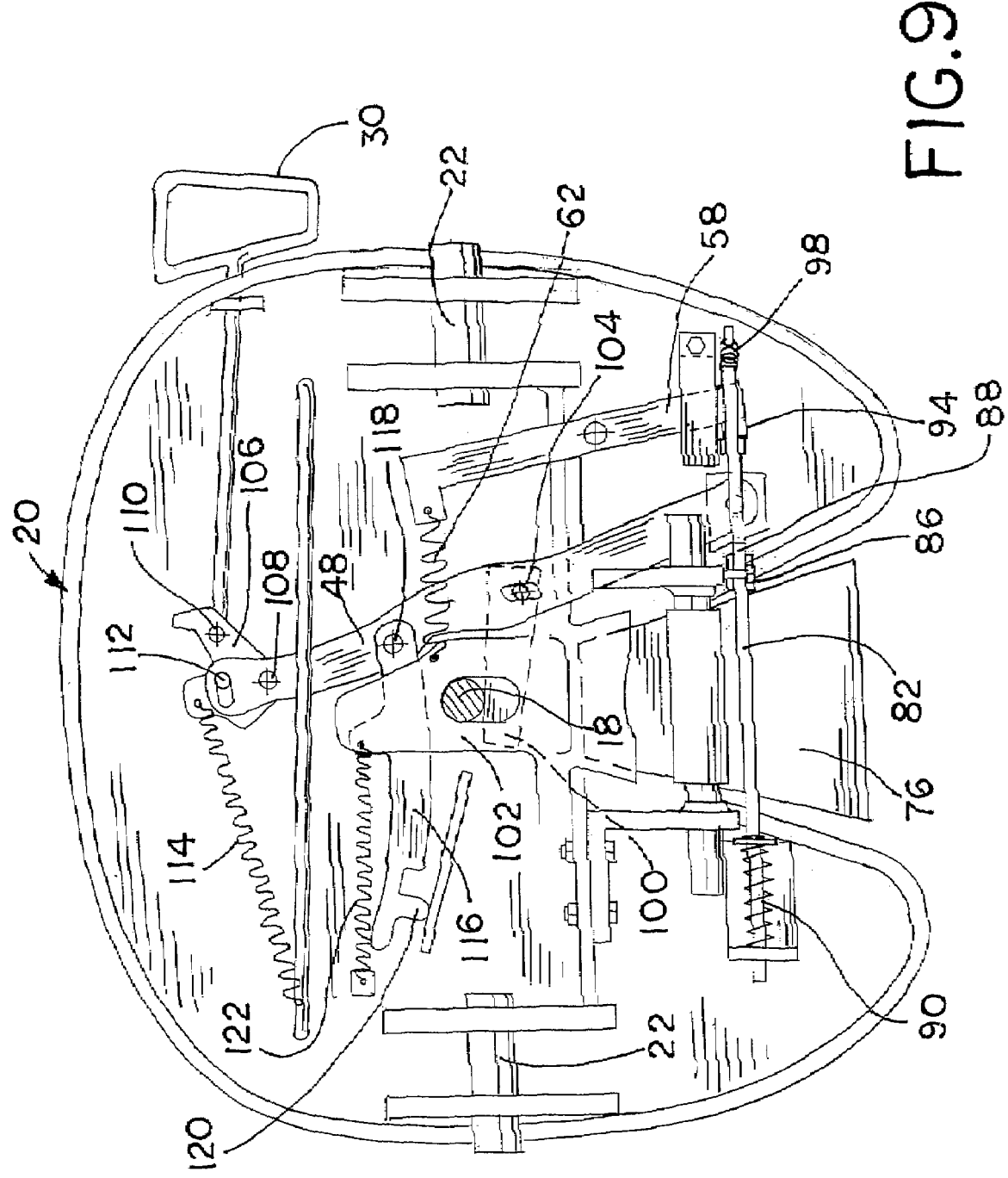
FIGS. 9, 10, and 11 are views similar to FIGS. 3, 4, and 2 respectively, but illustrating another embodiment of the invention.
Figure 10:
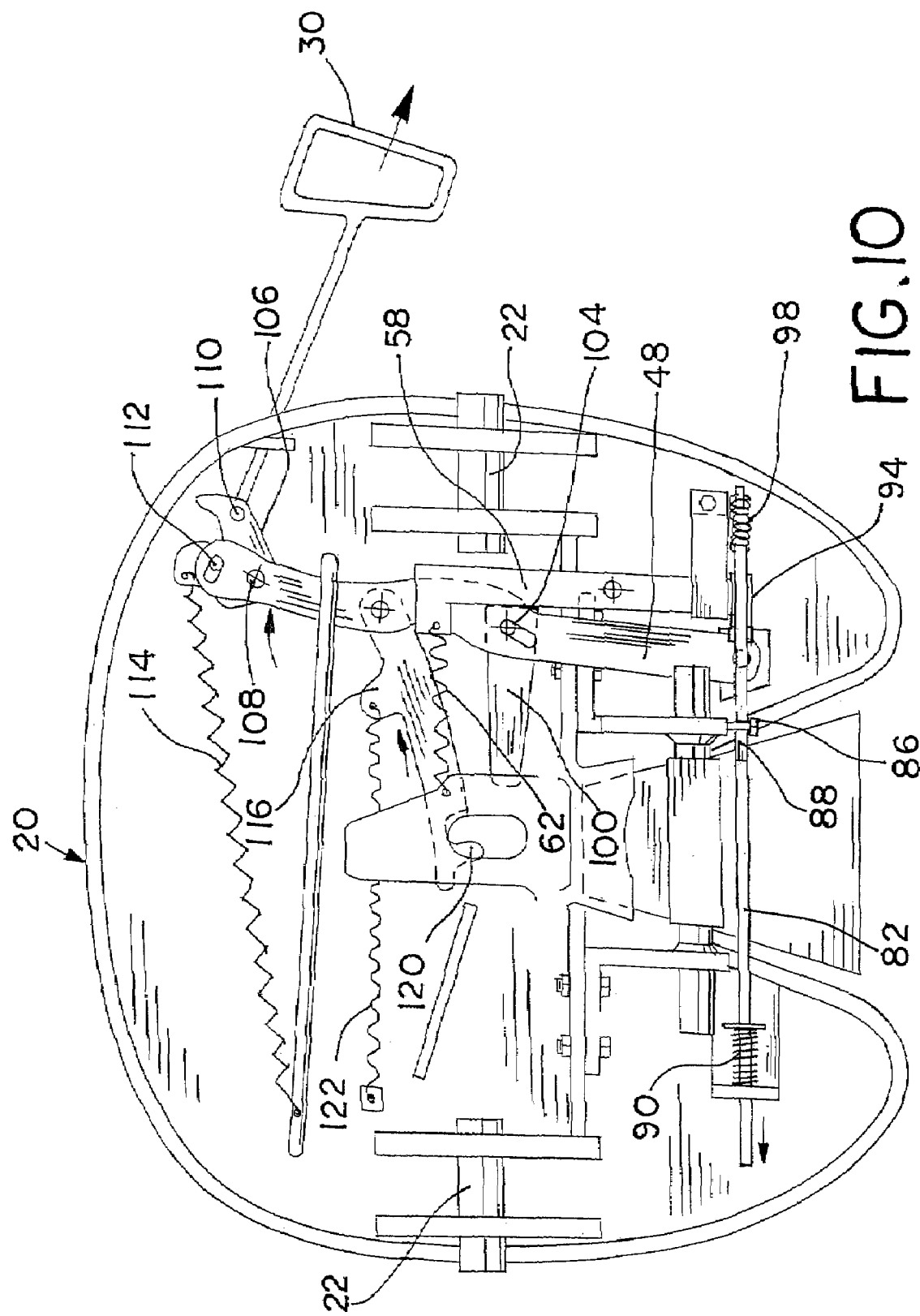
Figure 11:
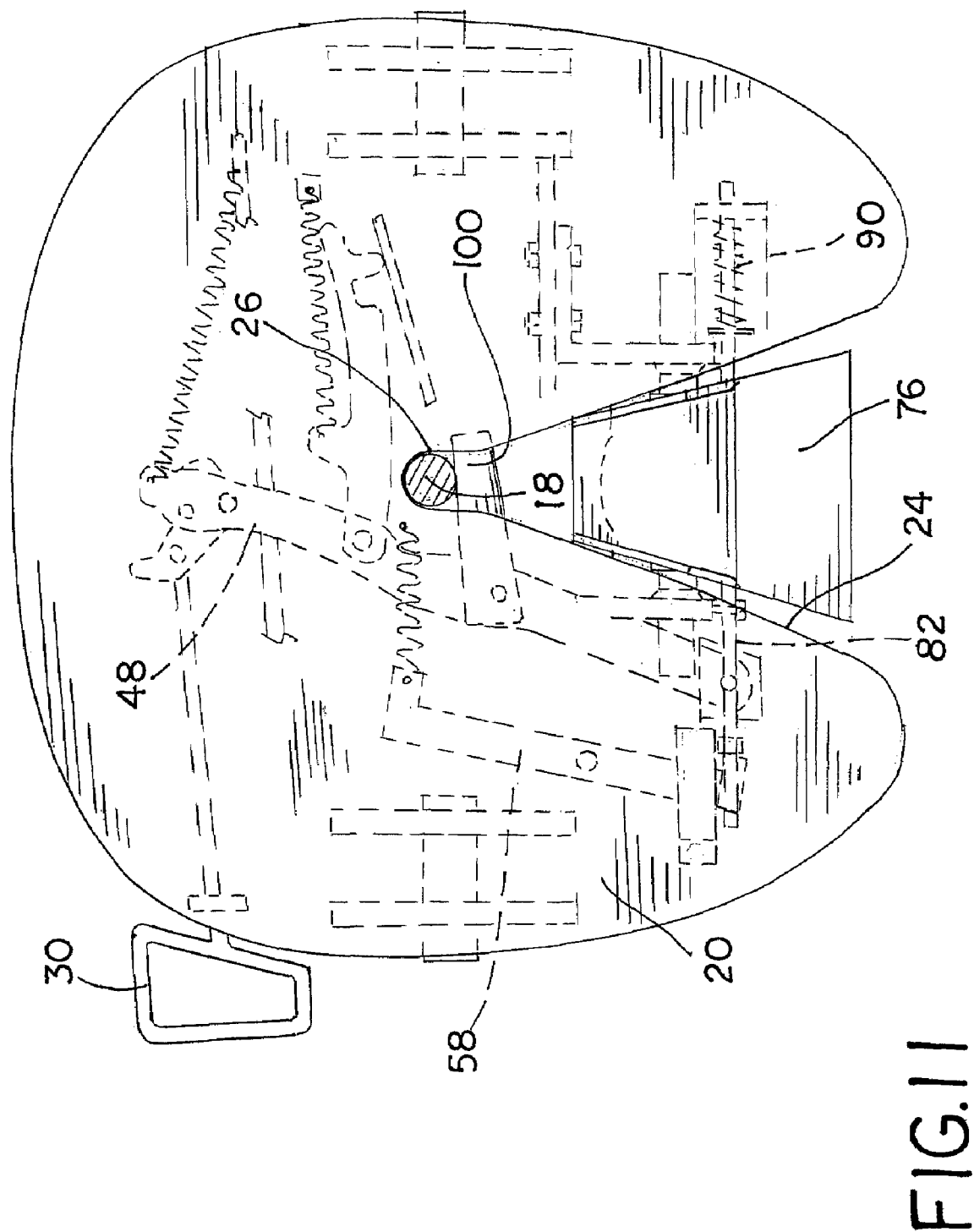

Referring now to the alternate embodiment of FIGS. 9-11, components the same or substantially the same as those of the preferred embodiment retain the same reference numeral. It will be understood that the manner in which the lever 58 and camming shaft 82 control the plate 76 is the same as in the preferred embodiment, and will not be discussed further. In the embodiment of FIGS. 9-11, locking jaw 38 of the preferred embodiment is replaced by a locking finger 100, which is slidably supported in a slot defined between a guide 102 and the main plate 20 and is attached to the lever 48 by a connection 104 which permits a small amount of "float" between the locking finger 100 and the lever 48. Handle 30 is connected to lever 48 through a rocker 106, which is pivotally connected to the lever 48 at 108 and to the lever 30 at 110. A stop pin and slot 112 limit the degree of motion of the rocker 106. A spring 114 is connected between the rocker 106 and the main plate 20. A swing arm 116 is pivotally connected to the lever 48 via a pivot 118, and is acted upon by a spring 122. Swing arm 114 includes a tab 120. When the tractor and trailer are to be uncoupled, handle 30 is pulled into the FIG. 10 position, thereby pivoting the lever 48 into engagement with the lever 58 and thereafter pivoting the lever 58 as the lever 48 moves through an additional arc. Accordingly, the lever 48, acting through camming shaft 82 and cam 84, moves the plate 76 into the inactive position, as in the preferred embodiment. At the same time, a portion of the tab 120 on swingarm 116 pivots into the locking aperture 26. The springs 114, 122 and 62 are designed so that when the components are moved into the positions illustrated in FIG. 9, an equilibrium position is achieved and the components remain in those positions until the tractor and trailer are again coupled, at which time the kingpin 18 strikes the tab 120, thereby causing the springs to move the components back into the positions illustrated in FIG. 9, so that the kingpin 18 is again locked into the locking aperture 26.

Although not illustrated in the drawings, the plate 76 may be operated directly by installing a handle on an extension of the camming shaft 82. Accordingly, when the sections of the vehicle are uncoupled, the operator is required to pull both the handle 30 and the handle connected to the camming shaft 82. This complicates uncoupling of the sections of the vehicle, but eliminates several components, such as the lever 58 and spring 62. Such an arrangement facilitates retrofitting of existing fifth wheel couplings with the safety latch of the invention.

What is claimed is:

1. Fifth wheel coupling for coupling sections of an articulated vehicle comprising a main plate defining a keyhole slot for receiving a kingpin, said keyhole slot terminating in a coupling aperture, a locking mechanism for locking the kingpin in the aperture to thereby couple said sections, and a safety latch mounted in said keyhole slot and movable from an inactive position permitting said kingpin to move through said slot and into said aperture to an active position blocking said keyhole slot thereby preventing movement of the kingpin through the keyhole slot, and a safety latch operating mechanism for moving the safety latch from the active to the inactive position to permit movement of the kingpin out of said keyhole slot to thereby permit uncoupling of the sections, said safety latch operating mechanism including a cam part mounted for movement relative to said main plate, said safety latch operating mechanism for forcing said cam part into engagement with a corresponding surface on said safety latch to urge the safety latch from said active to said inactive position.

2. Fifth wheel coupling as claimed in claim 1, wherein said safety latch is pivotally mounted in said aperture, said safety latch pivoting between said active and inactive positions.

3. Fifth wheel coupling as claimed in claim 2, wherein said safety latch is biased toward the active position, said safety latch defining a sliding surface engaged by said kingpin as the kingpin travels through the slot, said kingpin urging said safety latch into said inactive position as the kingpin moves through the slot toward said aperture.

4. Fifth wheel coupling as claimed in claim 3, wherein said safety latch is a weighted plate weighted to fall into said active position.

5. Fifth wheel coupling as claimed in claim 1, wherein said safety latch is a plate having an underside defining a lower surface, said corresponding surface of said safety latch being said lower surface.

6. Fifth wheel coupling for coupling sections of an articulated vehicle comprising a main plate defining a keyhole slot for receiving a kingpin, said keyhole slot terminating in a coupling aperture, a locking mechanism for locking the kingpin in the aperture to thereby couple said sections, and a safety latch mounted in said keyhole slot and movable from an inactive position permitting said kingpin to move through said slot and into said aperture to an active position blocking said keyhole slot thereby preventing movement of the kingpin through the keyhole slot, and a safety latch operating mechanism for moving the safety latch from the active to the inactive position to permit movement of the kingpin out of said keyhole slot to thereby permit uncoupling of the sections, wherein said safety latch operating mechanism includes a cam support rod slidably mounted on said main plate for movement generally transverse to said slot and a camming surface defined on said cam support rod, said safety latch operating mechanism forcing said camming surface on said cam support rod into engagement with a corresponding surface on said safety latch to urge said safety latch into said inactive position.

\* \* \* \* \*